(12) United States Patent
Kimura et al.

(10) Patent No.: US 7,131,422 B2
(45) Date of Patent: Nov. 7, 2006

(54) CONSTRUCTION MACHINE

(75) Inventors: Yasumasa Kimura, Kobe (JP); Hajime Nakashima, Hiroshima (JP); Kazuhiro Ueda, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 11/066,477

(22) Filed: Feb. 28, 2005

(65) Prior Publication Data

US 2005/0188926 A1 Sep. 1, 2005

(30) Foreign Application Priority Data

Mar. 1, 2004 (JP) .............................. 2004-056913
Mar. 24, 2004 (JP) .............................. 2004-087566

(51) Int. Cl.
*F02B 77/04* (2006.01)
*F02B 77/13* (2006.01)

(52) U.S. Cl. ................... 123/198 E; 181/204
(58) Field of Classification Search ............ 123/198 E; 181/200, 204
See application file for complete search history.

(56) References Cited

U.S. PATENT DOCUMENTS

| 3,856,439 A | * | 12/1974 | Moehrbach | ................. 181/204 |
| 4,503,931 A | | 3/1985 | Sugimoto et al. | |
| 5,228,530 A | * | 7/1993 | Tsuchihashi | ................. 181/211 |
| 6,405,825 B1 | | 6/2002 | Yabe et al. | |
| 6,688,424 B1 | | 2/2004 | Nakada et al. | |

FOREIGN PATENT DOCUMENTS

| EP | 0 414 639 A1 | 2/1991 |
| GB | 1 528 044 | 10/1978 |
| JP | 4-55527 | 2/1992 |
| JP | 7-127097 | 5/1995 |
| JP | 11-286961 | 10/1999 |

\* cited by examiner

*Primary Examiner*—Noah P. Kamen
(74) *Attorney, Agent, or Firm*—Oblon, Spivak, McClelland, Maier & Neustadt, P.C.

(57) ABSTRACT

A construction machine includes an engine guard, an engine, a cooling fan, and a device for being cooled by the cooling fan, and an exhaust duct. The engine guard accommodates the engine and has intake and exhaust openings. The intake opening and the exhaust opening are disposed in different side covers. The side covers correspond to the left and right side walls of the engine guard. The engine, the cooling fan, and the device are accommodated in the engine guard. The exhaust duct is disposed above and behind the engine, parallel with the flow of a fan air which has been used for cooling the engine, and substantially horizontally. The exhaust duct has an exit connected to the exhaust opening. The fan air introduced from the intake opening flows substantially linearly along the cooling fan, the engine, and the exhaust duct and is discharged from the exhaust opening.

16 Claims, 9 Drawing Sheets

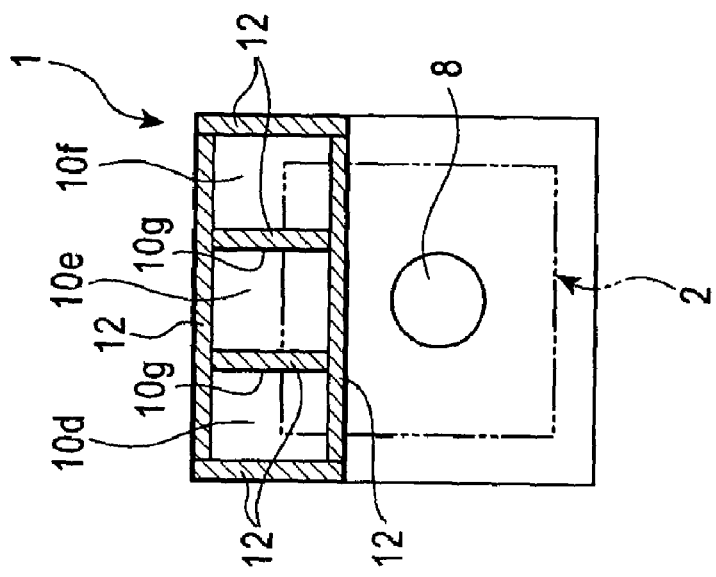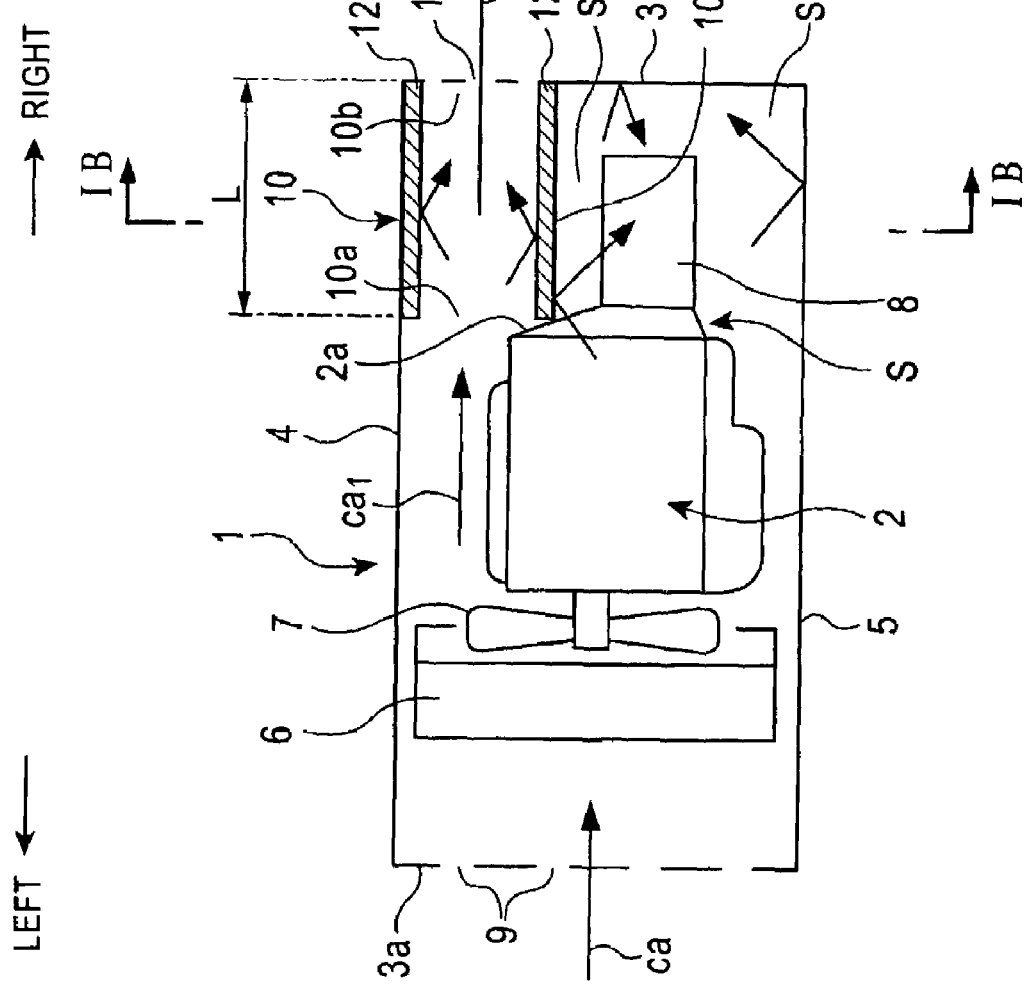

CONSTRUCTION MACHINE

BACKGROUND OF THE INVENTION

1. Field of the Invention

The present invention relates to a construction machine, such as a hydraulic excavator, having an exhaust gas discharging structure.

2. Description of the Related Art

Ordinarily, a hydraulic excavator comprises an engine guard which covers, for example, an engine and a cooling fan, and has an exhaust opening or an opening for an exhaust gas in the top surface thereof for discharging exhaust gas. Noise cannot be prevented from leaking upward along with the exhaust gas discharged via the exhaust opening.

In an environment having high-rise apartment buildings near construction sites, in particular, the noise leaking upward from the hydraulic excavator causes noise problem to at least the residents living at higher floors.

The noise level of a hydraulic excavator is calculated by measuring sound pressure levels with a plurality of microphones disposed on an imaginary hemisphere face (parallelepiped face) so as to surround the hydraulic excavator and by calculating the total sound power emitted from the construction machine on the basis of the average of the sound pressure levels (dB).

The noise level measured in this way has a characteristic in that, if any one of the sound pressure levels is high, the average sound pressure level is also high. Therefore, in order to restrict the noise of the construction machine, it is necessary to reduce the noise of the entire construction machine.

In providing a soundproof design on the basis of exhaust gas flow, when the flow of air current from a cooling fan is made complicated, flow path resistance is increased, thereby reducing cooling efficiency. Therefore, it is necessary to restrict noise while maintaining smooth flow of air current from the fan.

A soundproof structure is disclosed in, for example, Japanese Unexamined Patent Application Publication No. 4-55527. The sound-proof structure discharges exhaust gas downward from an exhaust opening of the machine body after cooling air current introduced from an intake opening at one side of the machine body in a widthwise direction has been guided to an engine cooling device disposed in a hood and the exhaust gas that has passed along the engine has been introduced into a duct path. The duct path is formed in an arcuate external wall of a counterweight.

In such a soundproof structure, however, since the flow of the cooling air current is guided to the duct path while changing the flow of the cooling air current in a complicated manner in the machine body, the flow path resistance increases, thereby increasing the load of the cooling fan.

In addition, since the duct path is formed at the counterweight, the space in the hood is reduced, thereby reducing the design freedom when disposing, for example, the engine.

SUMMARY OF THE INVENTION

Accordingly, it is an object of the present invention to provide a construction machine having an exhaust gas discharging structure which can restrict noise while reducing the load of a cooling fan by smoothening the flow of cooling air current from an intake side to an exhaust side.

To this end, according to the present invention, there is provided a construction machine basically comprising an engine guard, an engine, a cooling fan, a device for being cooled by the cooling fan, and an exhaust duct. The engine guard has an engine compartment, an intake opening, and an exhaust opening for an exhaust gas. The engine compartment accommodates the engine. The intake opening and the exhaust opening are disposed in different side covers (each one of side covers), respectively, the side covers corresponding to the left and right side walls of the engine guard. The engine, the cooling fan, and the device for being cooled by the cooling fan are accommodated in the engine guard and disposed in a width-wise direction of the machine. The exhaust duct for discharging the exhaust gas is disposed above and behind the engine in the engine compartment, parallel with the flow of fan air which has been used for cooling the engine, and substantially horizontally. The exhaust duct has an exit connected to the exhaust opening. The fan air introduced from the intake opening flows substantially linearly along the cooling fan, the engine, and the exhaust duct and is discharged from the exhaust opening.

According to the present invention, when the cooling fan rotates, cooling air is introduced from the intake opening at one of the side covers. Fan air which has linearly passed along the engine and the device for being cooled is introduced into the exhaust duct disposed parallel with flow direction of the fan air, and is smoothly discharged from the exhaust opening at the other side cover. Therefore, it is possible to increase the cooling effect and to reduce noise by reducing the load of the cooling fan.

Noise irregularly generated in various directions in the engine compartment is not discharged to the outside unless it passes through the exhaust duct. Such noise is discharged from the exhaust opening in an attenuated state by diminishing sound energy as a result of repeatedly reflecting the noise in the engine compartment and in the exhaust duct. As a result, the noise discharged from the exhaust opening is reduced.

BRIEF DESCRIPTION OF THE DRAWINGS

FIGS. 1A and 1B show an exhaust structure for discharging an exhaust gas of a construction machine in accordance with an embodiment of the present invention. More specifically, FIGS. 1A and 1B are a rear view and a vertical sectional view of the basic structure of the exhaust structure, respectively;

DESCRIPTION OF THE PREFERRED EMBODIMENTS

Figure 2:
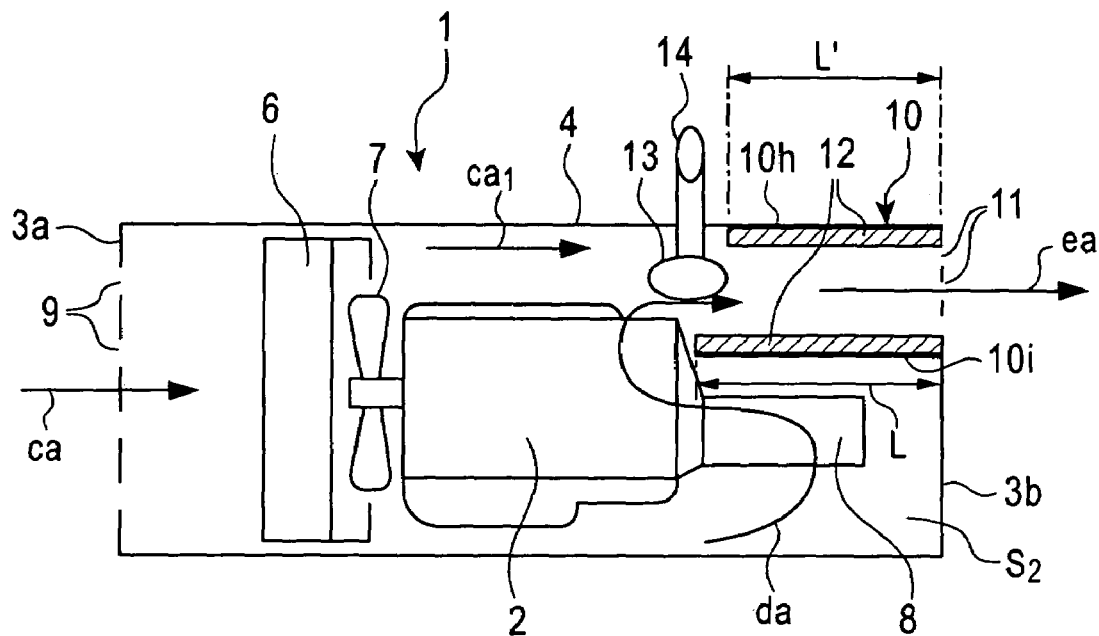
FIG. 2 is a rear view of the exhaust structure in accordance with the embodiment when it is used in the construction machine.

Hereunder, referring to FIGS. 1 to 16, embodiments of the present invention will be described in detail taking as an example the case in which an exhaust structure for discharging an exhaust gas in accordance with the present invention is applied to an upper rotating body of a hydraulic excavator which is one type of construction machine.

FIGS. 1A and 1B show the basic structure of an exhaust structure of a construction machine in accordance with the present invention. More specifically, FIG. 1A is a sectional view of an engine guard of a hydraulic excavator in a widthwise direction of the hydraulic excavator, and FIG. 1B is a sectional view taken along arrows IB shown in FIG. 1A.

The hydraulic excavator in accordance with the embodiment is assumed as having its engine disposed in the widthwise direction (that is, in a rightward/leftward direction in FIG. 1A) of the hydraulic excavator.

An engine guard 1 comprises a left side cover 3a, a right side cover 3b, an openable hood 4, and a lower frame 5. (In the embodiment, the left and right side walls of the engine guard 1 are called the left side cover 3a and the right side cover 3b, respectively.) Side covers comprise the side covers 3a and 3b. The left side cover 3a and the right side cover 3b are disposed on the left and right side of an engine 2. The hood 4 forms the upper surface of the engine guard 1.

A radiator 6 serving as a heat exchanger, a cooling fan 7, the engine 2, and a hydraulic pump 8 mounted to an output shaft of the engine 2 are disposed in that order in an engine compartment S formed in the engine guard 1. An oil cooler is sometimes disposed on the left of the radiator 6.

Intake slits 9 are formed in the left side cover 3a. When the cooling fan 7 is driven, cooling air ca is sucked in from the intake slits 9.

The sucked-in cooling air ca is introduced to the radiator 6 in order to perform heat exchange with cooling water for the engine in the radiator 6. Then, after heat exchange with the cooling water in the radiator 6, the cooling air as fan air flows along the outer wall of the engine 2 as indicated by $ca_1$ in FIG. 1A, and cools the engine 2 and the ambient atmosphere heated by heat dissipation from the engine 2.

A straight rectangular exhaust duct 10 for discharging an exhaust gas is substantially horizontally mounted downstream from the engine 2 in the direction of flow of the cooling air ca and above the hydraulic pump 8, that is, in a space $S_1$ defined by the hydraulic pump 8, the hood 4, and the right side cover 3b. The exhaust duct 10 is disposed as a first exhaust duct in relation to second to fourth exhaust ducts described later.

Accordingly, in the structure in which the hydraulic pump 8 is disposed behind the engine 2, the exhaust duct 10 can be disposed by making use of the space above the hydraulic pump 8.

Although, in the embodiment, the exhaust duct 10 is straight, it may be formed with a radius of curvature or bent at an obtuse angle.

The exhaust duct 10 is disposed with a length L so as to substantially connect the right side cover 3b and a rear end 2a of the engine 2. Current of the fan air $ca_1$ which has cooled the engine 2 is introduced into an entrance 10a of the exhaust duct 10. An exit 10b of the exhaust duct 10 is connected to an exhaust opening 11 formed in the upper portion of the right side cover 3b.

In cross section, the exhaust duct 10 has three cells 10d to 10f (see FIG. 1B) that are partitioned by partition plates 10g. By introducing a sound wave passing through the exhaust duct 10 into the cells, the number of reflections of sound energy is increased, thereby increasing the sound reduction effect.

In FIG. 1B, a sound-absorbing material 12 is adhered to one surface of each partition plate 10g.

Although, in the embodiment, the exhaust duct 10 has three cells, it may have more or less than three cells in accordance with the sound reduction level.

Most of the sound energy generated in the engine compartment S is attenuated by being repeatedly reflected by a bag $S_2$ defined by the lower frame 5, the right side cover 3b, and a lower surface 10c of the exhaust duct 10. Thereafter, the sound energy is further attenuated in the duct as it passes through the duct and is discharged out of the excavator from the exhaust opening 11. This allows noise discharged out of the excavator along with the flow of exhaust ea to be reduced.

The ventilation route of current of the cooling air ca is as follows. The cooling fan 7 and the radiator 6 are disposed in front of the engine 2, at the upper rotating body of the hydraulic excavator. The cooling air ca sucked in from the outside by the rotation of the cooling fan 7 is introduced to the radiator 6 in order to perform heat exchange between the cooling water for the engine and the cooling air current. The fan air that has passed the radiator 6 is guided to the engine 2 and cools the external surface of the engine 2. After the cooling, the exhaust gas ea is discharged to the outside from the exhaust opening 11 in the back portion of the engine guard 1. In this type of hydraulic excavator, the engine 2, the cooling fan 7, the radiator 6, the hydraulic pump 8, etc., are covered with the engine guard 1, and noise generated from a driving system is prevented from leaking to surrounding locations of the hydraulic excavator (horizontally).

A sound-absorbing material 12 may be adhered to the inside walls of the cells 10d to 10f of the exhaust duct 10, and may be a porous material, such as glass wool, rock wool, or soft urethane foam, molded into a sheet.

In the exhaust duct having the sound-absorbing material 12 adhered thereto (hereunder referred to as the "sound-absorbing exhaust duct"), the sound-absorbing material 12 absorbs a sound wave propagating through the sound-absorbing exhaust duct, thereby converting the sound energy to heat and reducing the sound. Therefore, it is desirable to use the sound-absorbing exhaust duct because it can reduce the noise by a greater amount than the above-described exhaust duct.

FIG. 2 shows the structure of the exhaust duct 10 mounted to the excavator as the construction machine.

Hereunder, components that correspond to those shown in FIG. 1 are given the same reference numerals and will not be described below.

As shown in FIG. 2, in the excavator, a muffler 13 is disposed near the engine 2, and muffled exhaust noise is discharged from an exhaust pipe 14 disposed in a standing manner from the hood 4.

In such a structure, the exhaust duct 10 is disposed so as to avoid the muffler 13. More specifically, a length L' of an upper plate 10h of the exhaust duct 10 is shorter than a length L of a lower plate 10i of the exhaust duct 10 in correspondence with the amount of space provided for the muffler 13 to prevent interference with the muffler 13.

An arrow da shown in FIG. 2 indicates the introduction of fan air current which has flown along the lower side of the engine 2 into the exhaust duct 10.

Figure 3:
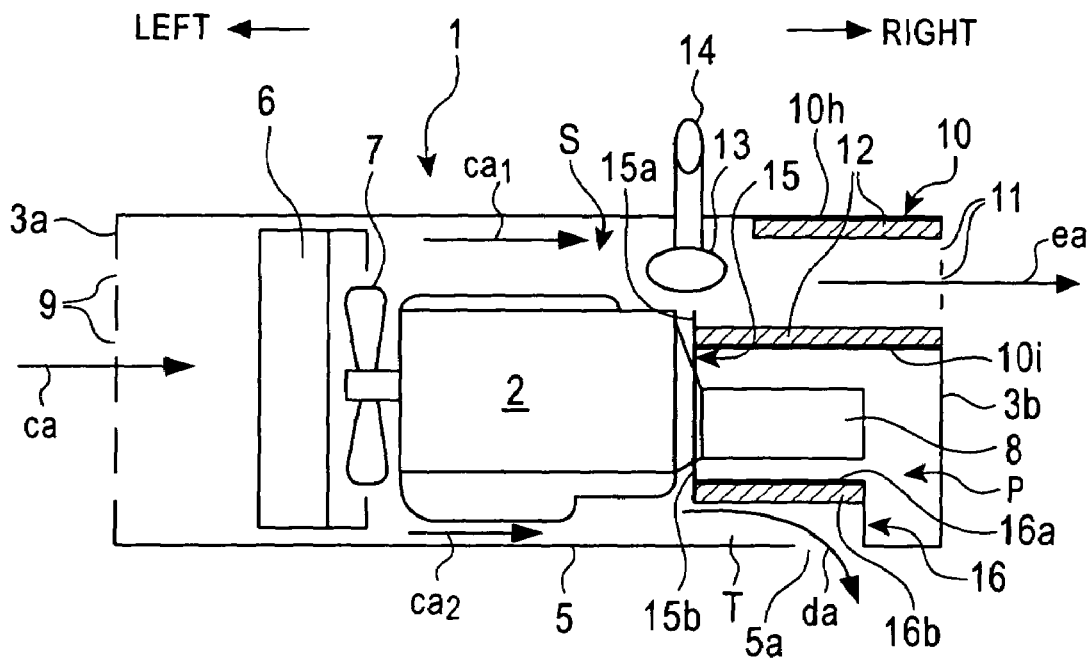
FIG. 3, which corresponds to FIG. 2, shows the structure of an auxiliary exhaust duct disposed below a hydraulic pump.

FIG. 3 shows the structure in which a fan air current da which tends to be retained at the lower side of an engine 2 is discharged downward from an opening 5a of a lower frame 5 of the excavator.

In FIG. 3, a shielding plate 15 serving as a partition plate for shielding the hydraulic pump 8 from the engine 2 is disposed on the right of the engine 2.

An upper end 15a of the shielding plate 15 is connected to a lower plate 10i of the exhaust duct 10, and a lower end 15b of the shielding plate 15 is connected to a cover 16a at an auxiliary second exhaust duct 16 disposed separately from the exhaust duct 10.

The cover 16a has an inverted U-shape in cross section, and defines a path T as a result of being mounted to the lower frame 5. The opening 5a is formed in the trailing end of this path T.

Like the sound-absorbing material 12, a sound-absorbing material 16b may be adhered to the second exhaust duct 16.

According to this structure, the shielding plate 15 causes the fan air $ca_1$ flowing along the upper side of the engine 2 to be guided/introduced into the exhaust duct 10 and to be discharged from an exhaust opening 11. In contrast, current of a fan air $ca_2$ flowing along the lower side of the engine 2 flows through the second exhaust duct 16 and is discharged from the opening 5a.

Accordingly, the fan air $ca_1$ and $ca_2$ can be smoothly discharged via the exhaust duct 10 and the second exhaust duct 16, disposed at the upper portion and lower portion of an engine compartment S, respectively.

Since noise in the engine compartment S is also reduced by the exhaust duct 10 and the second exhaust duct 16, the noise that is discharged along with the flow of the exhaust gas can be reduced.

The shielding plate 15 hermetically seals the hydraulic pump 8, and thus prevents pump noise from being discharged to the outside via the exhaust duct 10, thereby further reducing noise. In addition, since the engine compartment S and a pump chamber P are completely separated from each other by the shielding plate 15, even if oil leaks from a hose connected to the hydraulic pump 8, the oil does not fly to the engine compartment S.

In this way, when the auxiliary second exhaust duct 16 is disposed below the hydraulic pump 8, and when the exit of the second exhaust duct 16 is connected to the opening 5a formed in the bottom plate of the engine guard 1, the fan air which tends to be retained at the lower portion in the engine compartment S can be discharged. The noise in the engine compartment S is discharged by being scattered and reduced by the exhaust ducts 10 and 16.

The results of measurements of noise of the hydraulic excavator having the structure shown in FIG. 3 will be given below.

In the measurements, 12 t hydraulic excavators were used. For the hydraulic excavator not using the exhaust ducts in accordance with the present invention, the quantity of cooling air current measured at the front surface of a radiator was 101 $m^3$/min. In contrast, for the hydraulic excavator in accordance with the embodiment using the exhaust duct 10 and the second exhaust duct 16, the quantity of cooling air current measured at the front surface of a radiator was 110 $m^3$/min. Thus, the quantity of cooling air current was increased by 9%.

In accordance with a noise test method prescribed in ISO6395, the sound power levels of the hydraulic excavators were measured.

Although the noise level of the hydraulic excavator not using the exhaust ducts was 93 dB, the hydraulic excavator in accordance with the embodiment using the exhaust duct 10 and the second exhaust duct 16 was 90 dB. Therefore, the noise level was reduced by 3 dB.

From these measurement results, it was confirmed that the hydraulic excavator in accordance with the embodiment had enhanced cooling capability and reduced noise level.

Figure 4:
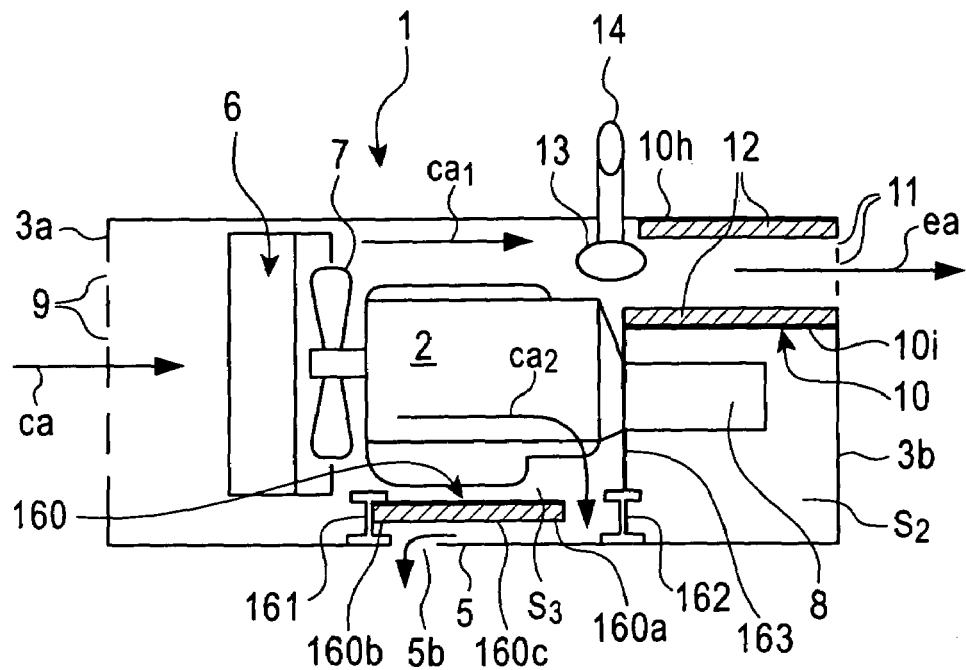
FIG. 4, which corresponds to FIG. 2, shows the structure of an auxiliary exhaust duct disposed below an engine.

FIG. 4 illustrates the structure having a third exhaust duct 160 disposed in place of the second exhaust duct 16 between the engine 2 and the lower frame 5.

In FIG. 4, a pair of center beams 161 and 162 are disposed at the central portion of a rotating frame in a forward-and-backward direction (that is, in a longitudinal direction of the excavator). The center beams 161 and 162 are disposed on both sides of the engine 2. A shielding plate 163 disposed in a standing manner from the right center beam 162 completely shields the engine 2 and the hydraulic pump 8. In this structure, a space $S_3$ between the engine 2 and the lower frame 5 is used to mount the third exhaust duct 160.

The third exhaust duct 160 is formed with the shape of a gutter. By mounting the open side facing downward to the lower frame 5, an exhaust path is formed. The breadth of the third exhaust duct 160 is substantially the same as that of the radiator 6.

One end 160a of the third exhaust duct 160 is open as a duct entrance facing the right center beam 162, and the other end 160b is connected to the left center beam 161. An opening 5b is formed in a portion of the lower frame 5 near the left center beam 161.

Therefore, a fan air $ca_2$ flowing along the lower portion of the external wall of the engine 2, colliding with the shielding plate 163, and having its direction of flow changed to a downward direction of flow enters the third exhaust duct 160 from the end 160a, and is discharged to the outside from the opening 5b formed below the end 160b.

When the engine 2 and the hydraulic pump 8 are completely shielded with the shielding plate 163 serving as a partition plate between the engine 2 and the hydraulic pump 8, it is possible to dispose the third exhaust duct 160 between the engine 2 and the bottom plate of the engine guard 1 and to dispose the third exhaust duct 160 so as to be closer to the engine 2 than the shielding plate 163, and to dispose the third exhaust duct 160 along the bottom plate so that its entrance opens so as to face the shielding plate 163 and its exit is connected to the opening 5b in the bottom plate of the engine guard 1.

It is desirable to adhere a sound-absorbing material 160c to an inside wall of the third exhaust duct 160. This makes it possible to increase the sound reduction effect.

Figure 5:
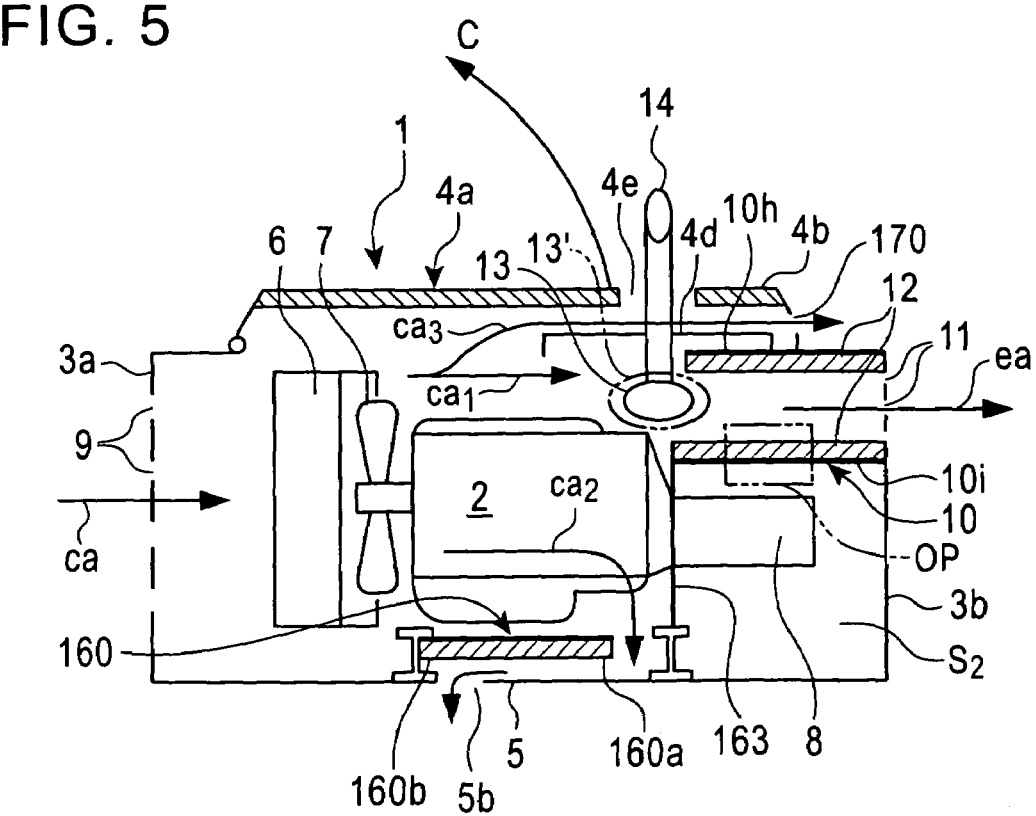
FIG. 5, which corresponds to FIG. 2, shows the structure of an auxiliary exhaust duct disposed below a hood.

FIG. 5 shows the structure comprising the exhaust duct 10 and an auxiliary exhaust duct 170 disposed near and separately from the exhaust duct 10.

In an engine guard 1 having a protruding hood 4a covering the upper portion of the engine 2, the hood 4a is used to dispose the auxiliary exhaust duct 170.

When, for example, an optional pump is to be mounted in the engine guard 1 (in a range OP indicated by an alternate long and two short dashed lines in FIG. 5) or when, for example, a large muffler 13 is to be mounted (in a range 13' indicated by an alternate long and two short lines in FIG. 5), the height of the path of the exhaust duct 10 is limited and an obstacle is produced at the entrance of the exhaust duct 10. In either case, a sufficient exhaust opening area cannot be provided.

In such cases, it is possible to use the hood 4a to dispose the auxiliary exhaust duct 170 and to discharge fan air from the exhaust duct 10 and the auxiliary exhaust duct 170.

Accordingly, in the excavator having the openable protruding hood 4a covering the upper portion of the engine 2 in the engine guard 1, it is possible to form an auxiliary exhaust opening in a side wall of the hood 4a near an exhaust opening and to dispose the auxiliary exhaust duct 170 which discharges from the auxiliary exhaust opening fan air which has cooled the engine 2 and which has been introduced into the hood 4a. Therefore, when the opening area of the exhaust duct 10 is not sufficient, the fan air can be discharged from both the exhaust duct 10 and the auxiliary exhaust duct 170.

Figure 6:
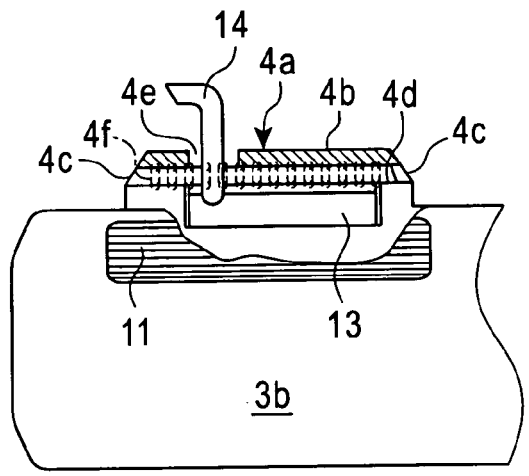
FIG. 6 is a right view of FIG. 5.

As shown in FIG. 6, the auxiliary exhaust duct 170 comprises a top plate 4b of the closed hood 4a, side plates 4c and 4c, and a bottom plate (shielding plate) 4d secured to an upper plate 10h of the exhaust duct 10 in parallel with the flow of the fan air $ca_1$. The upper plate 10h supports the hood 4a when it is being closed.

In the structure in which the hood 4a is opened in the direction of arrow C as a result of passing an exhaust pipe 14, a large opening 4e is formed in order to prevent interference with the exhaust pipe 14. Therefore, the noise of the engine may leak through the opening 4e. To overcome this problem, the bottom plate 4d is formed long towards the radiator 6 in order to prevent the noise emitted from the engine 2 from directly entering the opening 4e.

The exhaust pipe 14 is inserted in the bottom plate 4d, and the bottom plate 4d is secured to the upper plate 10h. Therefore, a through hole for passing through the exhaust pipe 14 is formed with an outside diameter that is slightly larger than the outside diameter of the exhaust pipe 14. The amount of noise leaking from the through hole is small.

According to this structure, a fan air $ca_3$ divided from the fan air $ca_1$ is discharged from the auxiliary exhaust duct 170. Therefore, when a sufficient exhaust opening area of the exhaust duct 10 cannot be provided, the necessary exhaust opening area can be provided by making use of the auxiliary exhaust duct 170. Since the bottom plate 4d is disposed between the hood 4a and the engine 2, the noise interception effect is reduced, so that heat emitted from the engine 2 is intercepted.

Accordingly, in the excavator in which the opening 4e for inserting the exhaust pipe 14 at the muffler 13 is formed in the hood 4a, it is possible to provide the bottom plate (shielding plate) 4d so as to extend substantially horizontally towards the engine 2 from an opening edge portion of the engine guard 1 supporting the hood 4a, to insert the exhaust pipe 14 into the bottom plate 4d, and to use the bottom plate 4d and the closed hood 4a to form the auxiliary exhaust duct 170.

Therefore, it is possible to prevent the engine noise from leaking from the opening 4e in which the exhaust pipe 14 is inserted.

In FIG. 6, the reference numeral 4e denotes the auxiliary exhaust opening formed in the side wall 4c of the hood 4a.

Figure 7:
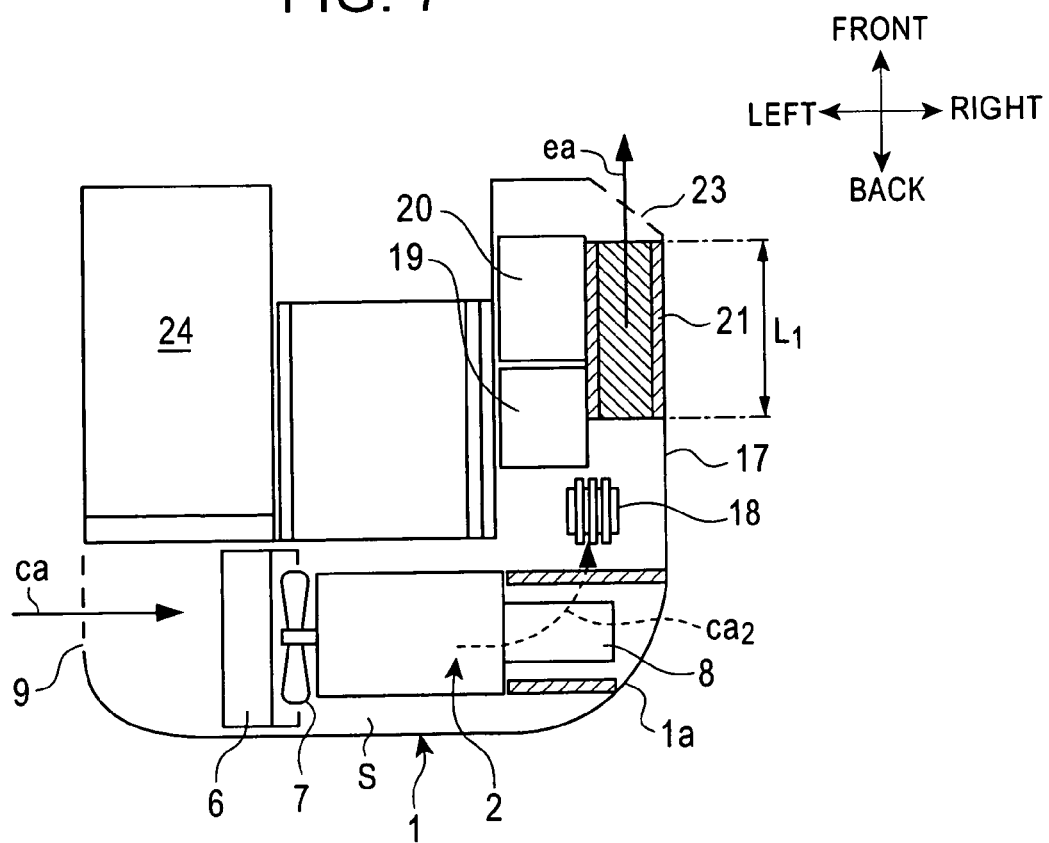
FIG. 7 is a plan view of the structure of another auxiliary exhaust duct.

FIG. 7 shows an upper rotating body of the hydraulic excavator in plan view, and a layout of devices disposed in a device cover 17 and the engine guard 1.

The aforementioned radiator 6, cooling fan 7, engine 2, and hydraulic pump 8 are disposed in the engine compartment S.

A control valve 18 is disposed in the device cover 17 extending in the shape of the letter L or in an L-shaped manner from the engine guard 1. An operating oil tank 19 and a fuel tank 20 are disposed in parallel at the front side of the device cover 17.

The tanks 19 and 20 are disposed at the left side of the device cover 17. Therefore, a path (gap) is formed between the inside wall of the device cover 17 and the tanks 19 and 20. This path corresponds to an exhaust path 21 serving as a fourth exhaust duct.

Accordingly, a second opening 23 is formed in the front portion of the device cover 17 which extends in the shape of the letter L from the engine guard 1 and which accommodates devices including the tanks 19 and 20, the devices including the tanks 19 and 20 are disposed at either the left side or the right side in the device cover 17, and the auxiliary straight fourth exhaust duct 21 for introducing fan air that has cooled the engine 2 is disposed substantially horizontally in the gap between the inside wall of the device cover 17 and the devices including the tanks 19 and 20. If the exit of the fourth exhaust duct 21 is connected to the second opening, the fan air which tends to be retained in the engine compartment S can be discharged from the front side of the device cover 17.

Figure 8:
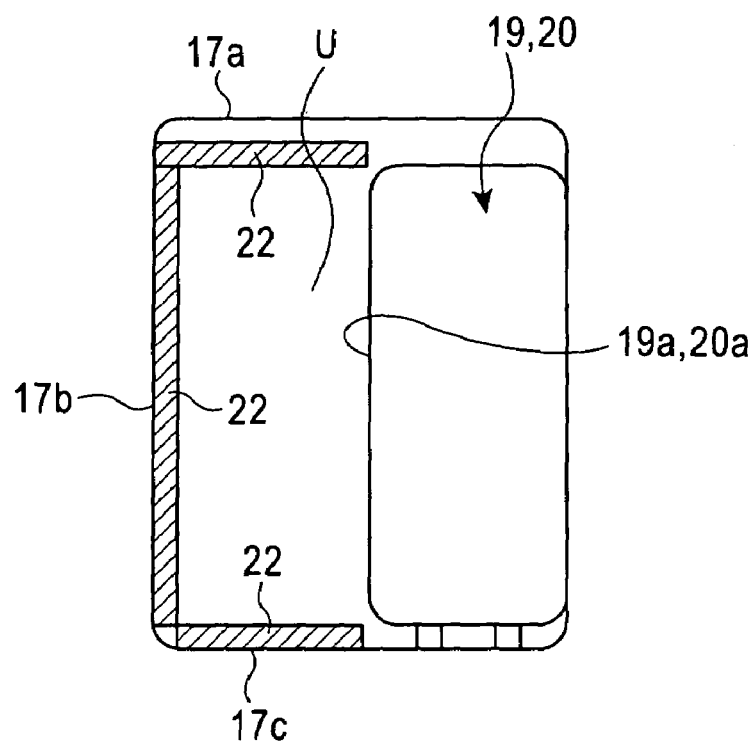
FIG. 8 is a vertical sectional view of the exhaust duct shown in FIG. 7.

As shown in FIG. 8, the exhaust path 21 is defined by an upper plate 17a, a side plate 17b, and a lower plate 17c of the device cover 17, and side walls 19a and 20a of the respective tanks 19 and 20. A sound-absorbing material 22 is directly adhered to the inside surfaces of the upper plate 17a, side plate 17b, and lower plate 17c. A path U having a U shape in cross section is defined by the sound-absorbing material 22.

In other words, in the embodiment, the gap between the device cover 17 and the tanks 19 and 20 is used as the exhaust path U.

If the fourth exhaust duct 21 is formed with a U shape in cross section, and its open side is shielded with the side walls of the respective tanks 19 and 20, the fan air flowing through the fourth exhaust duct 21 contacts the side walls of the tanks and thus cools the walls.

Figure 9:
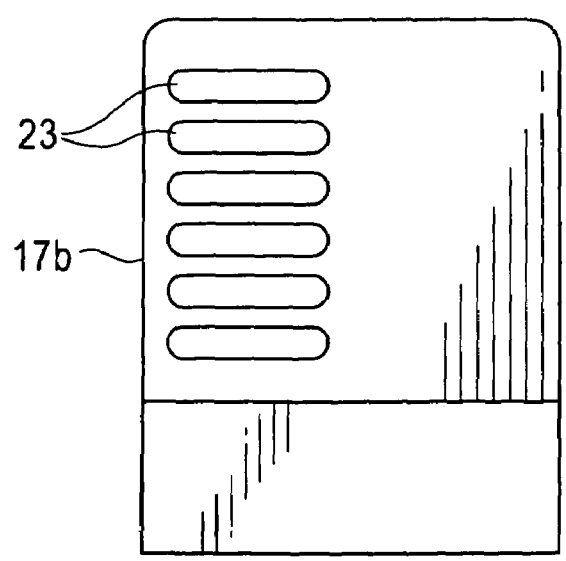
FIG. 9 is a front view of the shape of an opening shown in FIG. 7.

FIG. 9 is a front view of an end of the device cover 17 having the exhaust opening (second opening) 23 comprising a plurality of exhaust slits.

In the above-described exhaust structure, fan air $ca_2$ which has passed along the lower side of the engine 2 changes direction along an arcuate corner 1a of the engine guard 1 and flows forward, then cools the control valve 18, and then is introduced into the exhaust path 21.

Exhaust ea introduced into the exhaust path 21 flows while contacting the side walls 19a and 20a of the respective tanks 19 and 20 shown in FIG. 8, and cools the operating oil tank 19 and the fuel tank 20. It is desirable that the fan air $ca_2$ which has passed along the lower side of the engine 2 be vigorously guided into the device cover 17 and be flowed along the tanks 19 and 20 in the device cover 17. This makes it possible to increase the cooling capability on the devices as a result of efficiently cooling the devices in the engine compartment S and the tanks in the device cover. The fan air which tends to be retained in the engine compartment S can be smoothly discharged via the exhaust path 21 serving as the auxiliary fourth exhaust duct in the device cover 17.

Therefore, even if an exhaust opening for discharging an exhaust gas is to be formed in the hood 4, its opening area can be small, so that the noise discharged upward from the hood 4 can be reduced.

Figure 10:
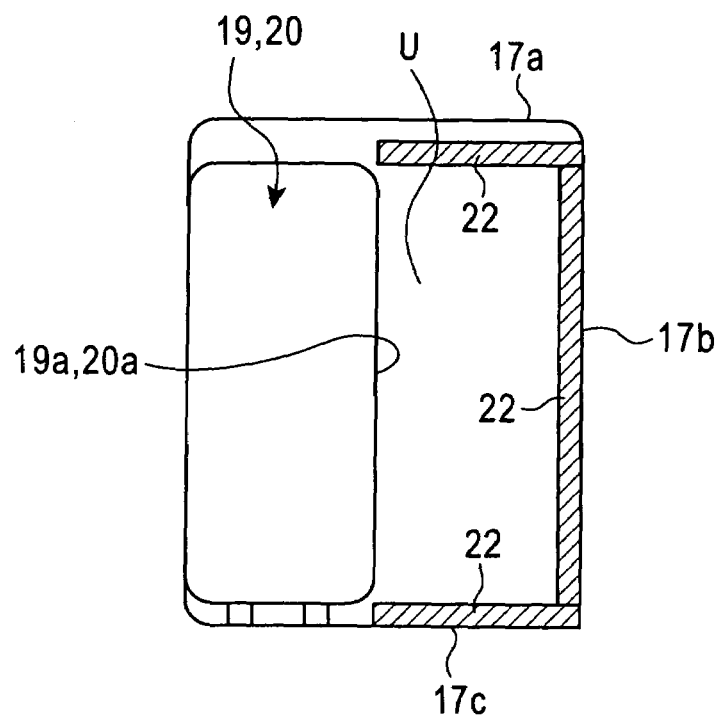
FIG. 10 is a vertical sectional view of a modification of the opening shown in FIG. 7.
Figure 11:
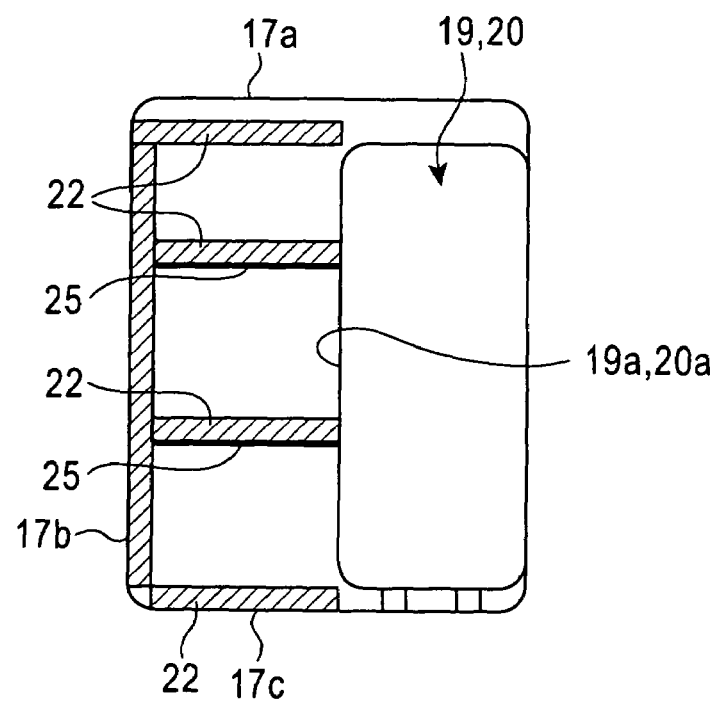
FIG. 11 is a vertical sectional view of another modification of the opening shown in FIG. 7.
Figure 12:
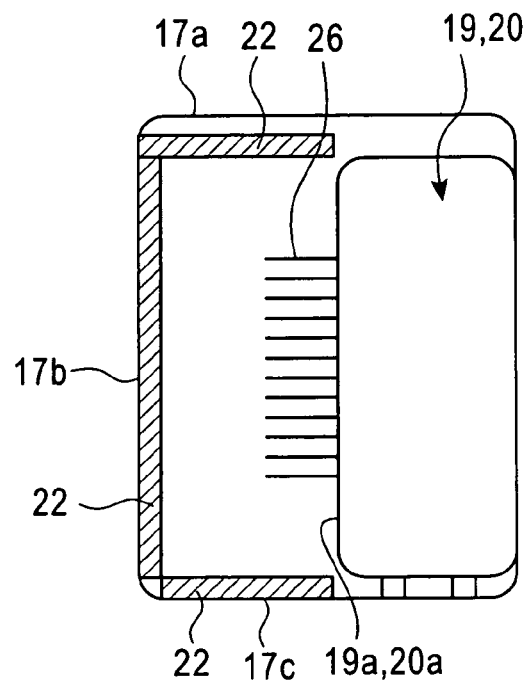
FIG. 12 is a vertical sectional view showing the arrangement of radiation fins attached to a tank or tanks shown in FIG. 7.

FIGS. 10 to 12 show modifications of the above-described exhaust path 21.

FIG. 10 shows the exhaust path 21 disposed at a side opposite to the side where the exhaust path 21 is disposed in FIG. 8 in a rightward/leftward direction, that is, closer to a cabin 24.

FIG. 11 shows partition plates 25 like shelves disposed in the exhaust path 21 and dividing the exhaust path 21 into three cells. A sound-absorbing material 22 is adhered to the upper surfaces of the partition plates 25.

By dividing the exhaust path 21 into a plurality of cells in this way, it is possible to increase the sound-absorption area and thus increase the sound-absorption capability.

FIG. 12 shows radiation fins 26 disposed at either one of or both of the operating oil tank 19 and the fuel tank 20.

The radiation fins 26 are arranged in parallel with the flow of cooling air ca so that they are like comb teeth when viewed from the front.

According to this structure, the area of contact of the cooling air with the tanks 19 and 20 is increased. Therefore, it is possible to increase the cooling efficiency with respect to the tanks.

A modification of the intake opening will be described.

Figure 13:
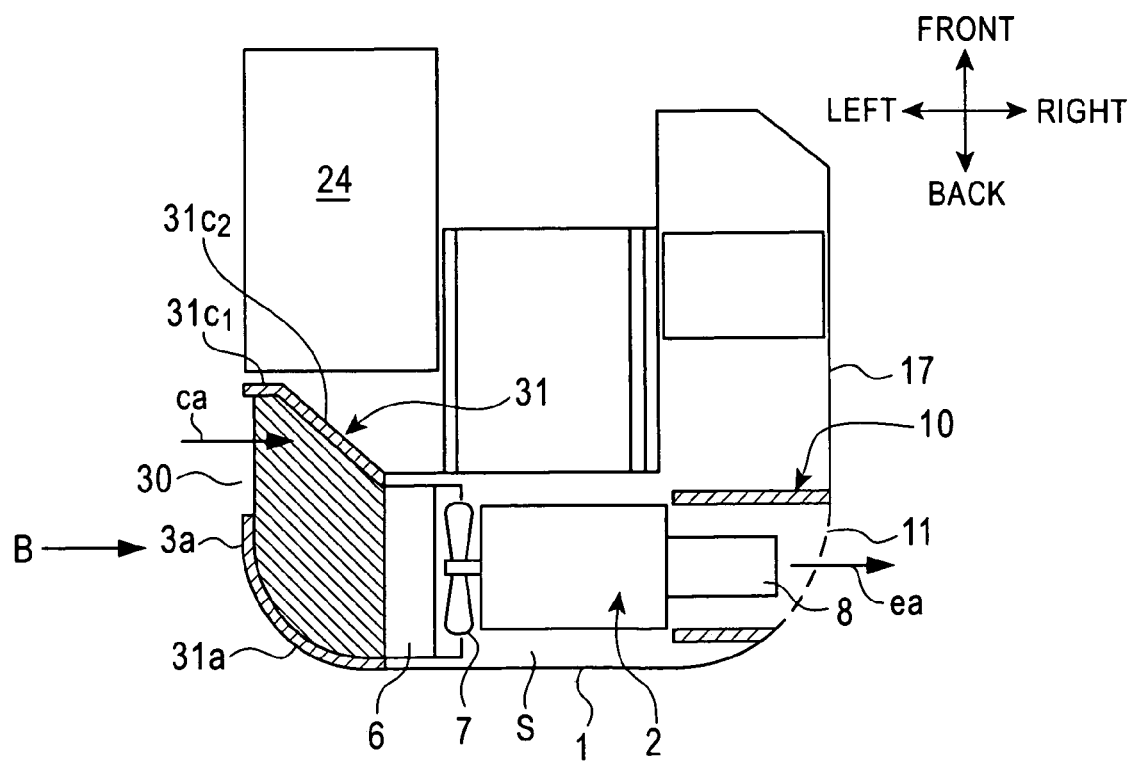
FIG. 13 is a plan view of the structure of an inlet duct which is a modification of an intake opening.

FIG. 13 shows a modification of the intake opening structure at the left side cover 3a.

In FIG. 13, an inlet duct 31 is disposed between an intake opening 30 and the radiator 6.

Figure 14:
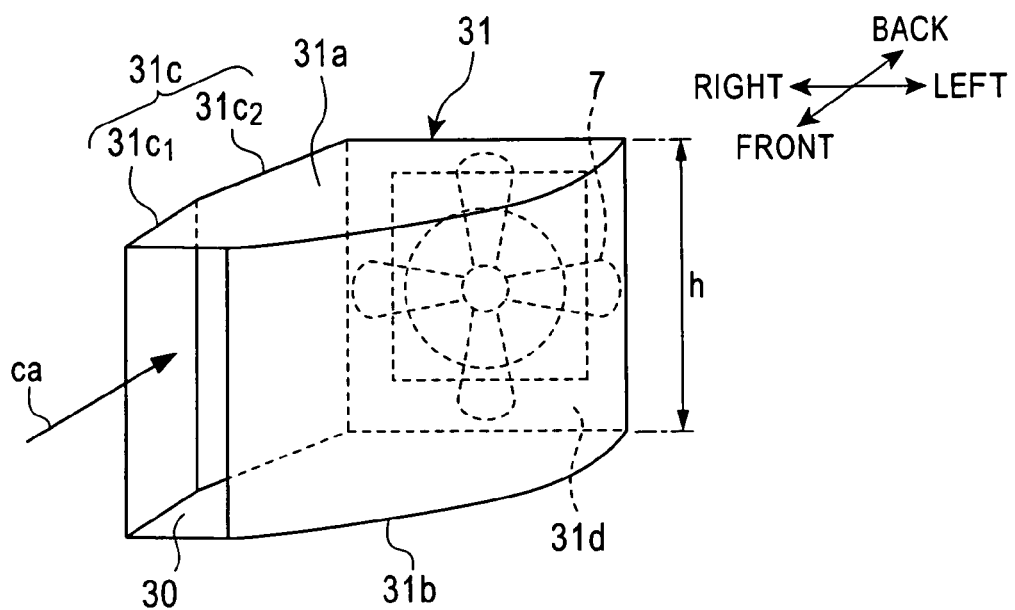
FIG. 14 is a perspective view of the structure of the inlet duct shown in FIG. 13.

The inlet duct 31 obliquely connects the intake opening 30 and the radiator 6. As shown in FIG. 14, the inlet duct 31 is formed with a cylindrical shape by an upper plate 31a, a lower plate 31b, a front plate 31c, and a back plate 31d. The back plate 31d is formed by an arcuate corner of the engine guard 1. The lower plate 31b is formed by the lower frame 5. A height h of the inlet duct 31 is substantially the same as the height of the outer frame of the radiator 6.

When a counterweight (not shown) is positioned at the back side of the engine guard 1, the inside wall of the counterweight may be used as the back surface of the inlet duct 31.

The front plate 31c is formed with a dogleg shape by an introducing section $31c_1$ and a guiding section $31c_2$. The introducing section $31c_1$ is disposed in a rightward/leftward direction, and the guiding section $31c_2$ is bent towards the radiator 6 from the right edge of the introducing section $31c_1$. A large amount of cooling air is introduced into the introducing section $31c_1$, and the introduced cooling air current is guided to the radiator 6 by the guiding section $31c_2$.

Figure 15:
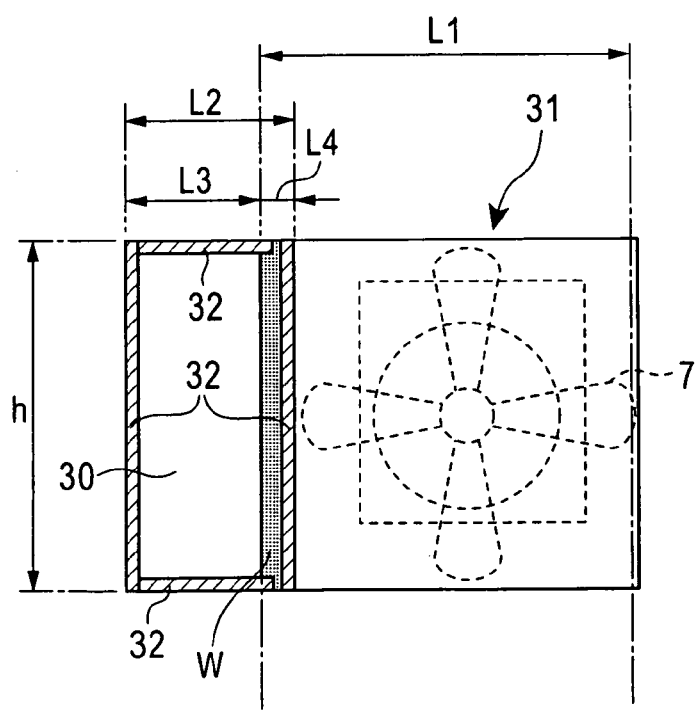
FIG. 15 is a front view illustrating the disposition of an intake opening in the inlet duct.

FIG. 15 shows the inlet duct 31 as viewed from a direction perpendicular to the ventilation surface of the radiator 6 (that is, in the direction of arrow B in FIG. 13).

In FIG. 15, when the width of the radiator 6 is L1 and the breadth of the outer frame of the intake opening 30 is L2, a length L3 of the intake opening 30 is offset to the outer side of the radiator 6 and a length L4 overlaps the radiator 6. In other words, a range which allows the radiator 6 to be seen from the intake opening 30 is limited to a range W (breadth L4×height h).

It is desirable for the intake opening 30 to be disposed so as to be offset from the radiator 6. In this case, the sound wave discharged towards the intake opening 30 from the radiator 6 is repeatedly reflected by the inside wall of the inlet duct 31, thereby restricting the noise directly discharged to the outside.

Therefore, if the radiator 6 serving as a heat exchanger is provided as a device to be cooled, and the intake opening is disposed substantially parallel with the radiator 6 in plan view thereof and is offset from the radiator 6 as viewed from the front side of the radiator 6, noise is prevented from directly leaking to the outside, thereby making it possible to reduce noise even at the intake side.

It is desirable to adhere a sound-absorbing material 32 to the inside wall of the inlet duct 31. In this case, since the sound energy is absorbed in the duct, it is possible to further reduce noise.

The amount of noise reduction was measured in steps by progressively increasing the offset amount as a resulting of moving the intake opening 30 from a position where the intake opening 30 is disposed at the front side of the ventilation surface of the radiator 6 (that is, where the offset amount is 0%) to a final position where the intake opening 30 is completely offset from the front side of the radiator 6 (that is, where the offset amount is 125%).

Table 1 gives the results of analysis.

TABLE 1

| OFFSET AMOUNT | NOISE REDUCTION (dB) |
|---|---|
| 0% | |
| 25% | 1.1 |
| 50% | 3.2 |
| 75% | 7.0 |
| 100% | 8.3 |
| 125% | 9.7 |

As shown in TABLE 1, on the basis of the results of the measurements of the noise reduction when the offset amount was changed, it was confirmed that, when the offset amount was 50%, the noise reduction was 3.2 dB, which is greater than 3 dB considered as a significant difference. When the offset amount was 100%, a large noise reduction of 8.3 dB was obtained.

On the basis of the results of the analysis, it was confirmed that, if the radiator 6 and the intake opening 30 were shifted from each other by 100%, that is, if they were disposed so that the ventilation surface of the radiator 6 cannot be seen through the intake opening 30, a sufficient sound deadening effect was obtained, and that, if the offset amount was equal to or greater than 50% and less than 100%, a significant sound deadening effect was obtained.

As shown in FIG. 13, it is desirable to form the exhaust structure so that the intake opening 30 offset from the radiator 6 is formed in the left side cover 3a and the exhaust duct 10 is disposed at the right side cover 3b parallel with the flow of cooling air. In this case, the noise generated in the engine compartment S tries to leak from the exhaust opening 11 and the intake opening 30. However, since the intake opening 30 is offset from the radiator 6 in the forward direction, direct leakage of a sound wave is restricted and the sound energy of the sound wave leaking through the inlet duct 31 is absorbed by the sound-absorbing material 32, so that the noise trying to leak from the intake opening 30 is reduced.

The exhaust duct 10 is disposed at the exhaust opening 11. Although noise leaks through the exhaust duct 10, the noise is repeatedly reflected in the exhaust duct 10, thereby reducing the noise. When the sound-absorbing material 12 is adhered to the inside wall of the exhaust duct 10, the sound energy is absorbed by the sound-absorbing material 12, so that the noise leakage can be restricted.

By offsetting the intake opening 30, the flow of the cooling air becomes substantially linear, so that, as mentioned above, the noise leakage from the intake opening 30 can be restricted without reducing the fan efficiency.

Therefore, the noise generated in the engine compartment S is effectively reduced when it passes through the exhaust opening 11 and the intake opening 31, formed as paths for the cooling air. Consequently, the noise can be reduced by a greater amount in this exhaust structure than in the exhaust structures shown in FIGS. 1 and 7.

The inlet duct 31 comprises the guiding section $31c_2$ inclining towards the radiator 6. Therefore, the flow resistance can be small, so that the cooling air ca to be smoothly introduced to the radiator 6. Consequently, the cooling efficiency is not reduced.

Figure 16:
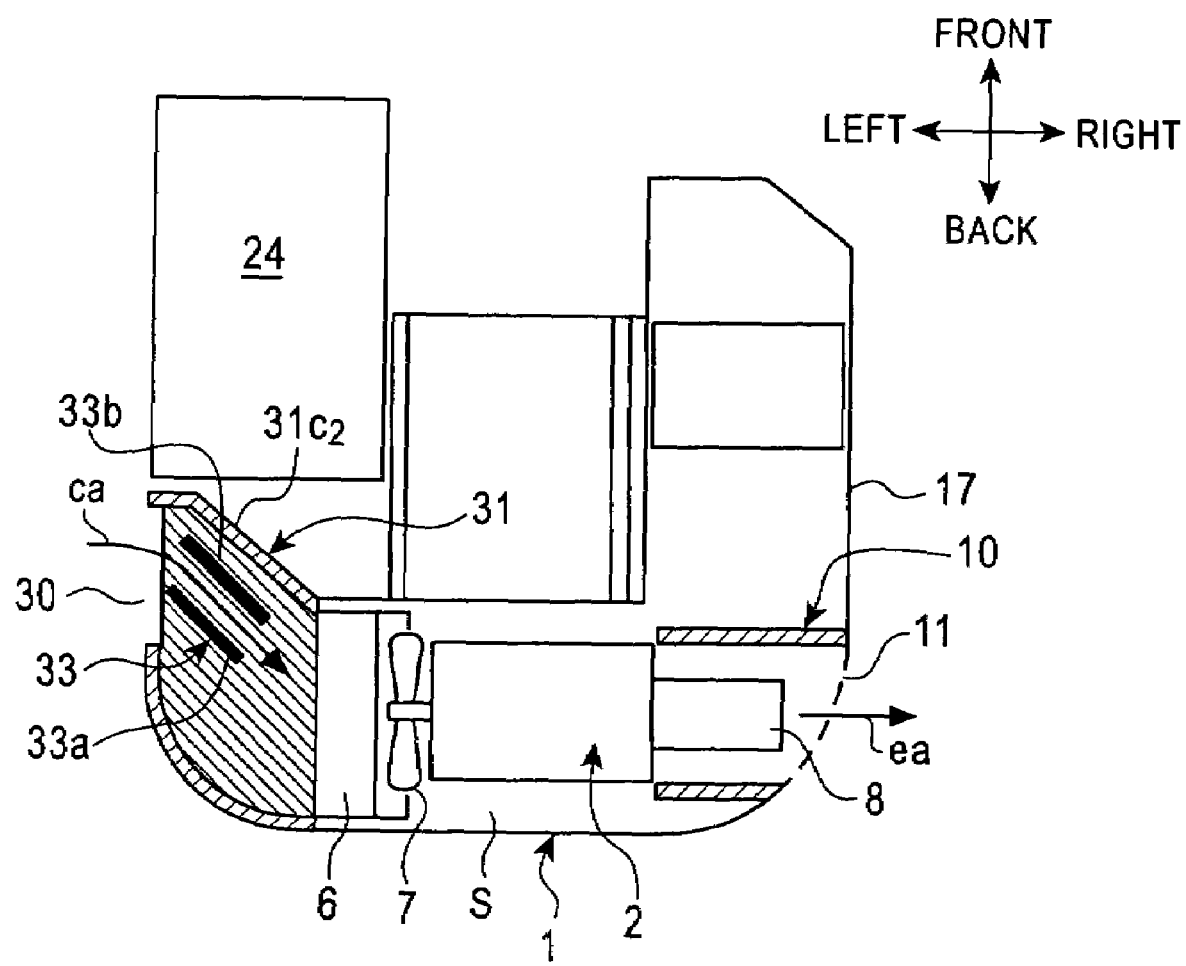
FIG. 16 is a plan view of a modification of the inlet duct shown in FIG. 15.

FIG. 16 shows another modification of the intake opening structure.

The intake opening structure shown in FIG. 16 comprises a sound absorber 33 of a splitter type disposed near the intake opening 30 in the inlet duct 31.

The splitter-type sound absorber 33 is conventionally known as one type of sound absorber. Ordinarily, in the sound absorber 33, a sound-absorbing material is adhered to the inner sides of partition plates 33a and 33b partitioning the duct in order to absorb and reduce the sound energy of a propagating sound wave. The partition plates 33a and 33b are disposed parallel with the inclination of the guiding section $31c_2$.

If the splitter-type sound absorber 33 is disposed at the inlet duct 31, the sound-deadening area can be increased. Therefore, the sound-deadening efficiency of the inlet duct 31 can be increased. In the modification, since the splitter-type sound absorber 33 is only disposed near the intake opening 30, and thus is not disposed near the radiator 6, the radiator 6 can be easily maintained and the ventilation resistance is not increased.

When the splitter-type sound absorber 33 is disposed in this way, the noise leakage from the inlet duct 31 can be made less than the noise leakage from the inlet duct 31 shown in FIG. 13.

Although the splitter-type sound absorber 33 is used, a cell-type sound absorber having a cross section that is partitioned into smaller cells than in the splitter type as long as the ventilation resistance does not increase considerably and having a sound-absorbing material adhered to the inner sides of the partitions may be used.

Although, in the modifications shown in FIGS. 13 and 16, the intake opening 30 is offset forwardly from the front side of the radiator 6, it may be offset upward, downward, or backward if there is offsetting space.

The noise reduction effect can be further increased by using two or more of the first to fourth exhaust ducts in combination.

Although the invention has been described with reference to the preferred embodiments in the attached figures, it is noted that equivalents may be employed and substitutions made herein without departing from the scope of the invention as recited in the claims.

What is claimed is:

1. A construction machine comprising:
   an engine guard having an engine compartment, an intake opening, and an exhaust opening for an exhaust gas, the engine compartment accommodating an engine;
   the engine, a cooling fan, and a device for being cooled by the cooling fan, the engine being accommodated in the engine guard and disposed in a widthwise direction of the machine; and
   an exhaust duct for discharging the exhaust gas disposed above and behind the engine in the engine compartment, parallel with the flow of a fan air by the cooling fan which has been used for cooling the engine, and substantially horizontally, the exhaust duct having an exit connected to the exhaust opening,
   wherein the fan air introduced from the intake opening flows along the cooling fan, the engine, and the exhaust duct and is discharged from the exhaust opening,
   wherein a hydraulic pump is disposed behind the engine, and the exhaust duct is disposed above the hydraulic pump.

2. The construction machine according to claim 1, in case that the exhaust duct is a first exhaust duct, further comprising a second exhaust duct disposed below the hydraulic pump, the second exhaust duct having an exit connected to an opening in a bottom plate of the engine guard.

3. The construction machine according to claim 2, further comprising a partition plate disposed between the engine and the hydraulic pump, the partition plate guiding the fan air which has been used for cooling the engine to the first exhaust duct and the second exhaust duct.

4. The construction machine according to claim 1, further comprising:
   a partition plate disposed between the engine and the hydraulic pump; and
   a third exhaust duct disposed between the engine and a bottom plate of the engine guard, being closer to the engine than the partition plate, and being parallel with the bottom plate, the third exhaust duct having an entrance opening so as to face the partition plate and an exit connected to an opening in the bottom plate of the engine guard.

5. The construction machine according to claim 4, further comprising:
   a device cover extending in an L-shaped manner from the engine guard, accommodating a device including a tank, and having a second opening in the front portion thereof, the device including the tank being disposed at either the left side or the right side in the device cover; and
   a fourth exhaust duct disposed substantially horizontally in a gap between an inside wall of the device cover and the device including the tank, the fourth exhaust duct having an exit connected to the second opening, the fan air that has been used for cooling the engine being introduced into the fourth exhaust duct.

6. The construction machine according to claim 2, further comprising:
   a device cover extending in an L-shaped manner from the engine guard, accommodating a device including a tank, and having a second opening in the front portion thereof, the device including the tank being disposed at either the left side or the right side in the device cover; and
   a fourth exhaust duct disposed substantially horizontally in a gap between an inside wall of the device cover and the device including the tank, the fourth exhaust duct having an exit connected to the second opening, the fan air that has been used for cooling the engine being introduced into the fourth exhaust duct.

7. The construction machine according to claim 1, wherein the device for being cooled is a heat exchanger, and the intake opening is disposed substantially parallel with the heat exchanger in plan view thereof and is offset from the heat exchanger as viewed from the front side of the heat exchanger.

8. The construction machine according to claim 7, wherein the intake opening and the heat exchanger are connected with an inlet duct, an inside wall of the inlet duct having a sound-absorbing material attached thereto.

9. The construction machine according to claim 1, wherein the exhaust duct is divided into cells in cross section with a plurality of partition plates.

10. A construction machine comprising:
    an engine guard having an engine compartment, an intake opening, and an exhaust opening for an exhaust gas, the engine compartment accommodating an engine, the intake opening and the exhaust opening being disposed in each one of side covers, respectively, which correspond to the left and right side walls of the engine guard;
the engine, a cooling fan, and a device for being cooled by the cooling fan, the engine being accommodated in the engine guard and disposed in a widthwise direction of the machine;
an exhaust duct for discharging the exhaust gas disposed above and behind the engine in the engine compartment, parallel with the flow of a fan air by the cooling fan which has been used for cooling the engine, and substantially horizontally, the exhaust duct having an exit connected to the exhaust opening, wherein the fan air introduced from the intake opening flows substantially linearly along the cooling fan, the engine, and the exhaust duct and is discharged from the exhaust opening,
a device cover extending in an L-shaped manner from the engine guard, accommodating a device including a tank, and having a second opening in the front portion thereof, the device including the tank being disposed at either the left side or the right side in the device cover; and
a fourth exhaust duct disposed substantially horizontally in a gap between an inside wall of the device cover and the device including the tank, the fourth exhaust duct having an exit connected to the second opening, the fan air that has been used for cooling the engine being introduced into the fourth exhaust duct.

11. The construction machine according to claim 10, wherein the fourth exhaust duct is U-shaped in cross section, and the open side of the fourth exhaust duct is shielded with a side wall of the tank.

12. The construction machine according to claim 11, wherein the side wall of the tank has a radiation fin attached thereto.

13. A construction machine comprising:
an engine guard having an engine compartment, an intake opening, and an exhaust opening for an exhaust gas, the engine compartment accommodating an engine, the intake opening and the exhaust opening being disposed in each one of side covers, respectively, which correspond to the left and right side walls of the engine guard;
the engine, a cooling fan, and a device for being cooled by the cooling fan, the engine being accommodated in the engine guard and disposed in a widthwise direction of the machine; and
an exhaust duct for discharging the exhaust gas disposed above and behind the engine in the engine compartment, parallel with the flow of a fan air by the cooling fan which has been used for cooling the engine, and substantially horizontally, the exhaust duct having an exit connected to the exhaust opening,
wherein the fan air introduced from the intake opening flows substantially linearly along the cooling fan, the engine, and the exhaust duct and is discharged from the exhaust opening,
wherein the engine guard has an openable protruding hood for covering the top portion of the engine, a side wall of the hood having an auxiliary exhaust opening formed near the exhaust opening, the hood having an auxiliary exhaust duct inside for discharging from the auxiliary exhaust opening the fan air which has been used for cooling the engine and has been introduced into the hood.

14. The construction machine according to claim 13, wherein the auxiliary exhaust duct comprises the closed hood and a shielding plate, an opening in the hood receives an exhaust pipe disposed at a muffler and through the shielding plate in such a manner that the exhaust pipe comes out of the hood outside, and the shielding plate extends substantially horizontally towards the engine from an opening edge portion of the engine guard supporting the hood.

15. A construction machine comprising:
an engine guard having an engine compartment, an intake opening, and an exhaust opening for an exhaust gas, the engine compartment accommodating an engine, the intake opening and the exhaust opening being disposed in each one of side covers, respectively, which correspond to the left and right side walls of the engine guard;
the engine, a cooling fan, and a device for being cooled by the cooling fan, the engine being accommodated in the engine guard and disposed in a widthwise direction of the machine; and
an exhaust duct for discharging the exhaust gas disposed above and behind the engine in the engine compartment, parallel with the flow of a fan air by the cooling fan which has been used for cooling the engine, and substantially horizontally, the exhaust duct having an exit connected to the exhaust opening,
wherein the fan air introduced from the intake opening flows substantially linearly along the cooling fan, the engine, and the exhaust duct and is discharged from the exhaust opening,
wherein an inside wall of the exhaust duct has a sound-absorbing material attached thereto.

16. A construction machine comprising:
an engine guard having an engine compartment, an intake opening, and an exhaust opening for an exhaust gas, the engine compartment accommodating an engine, the intake opening and the exhaust opening being disposed in each one of side covers, respectively, which correspond to the left and right side walls of the engine guard;
the engine, a cooling fan, and a device for being cooled by the cooling fan, the engine being accommodated in the engine guard and disposed in a widthwise direction of the machine; and
an exhaust duct for discharging the exhaust gas disposed above and behind the engine in the engine compartment, parallel with the flow of a fan air by the cooling fan which has been used for cooling the engine, and substantially horizontally, the exhaust duct having an exit connected to the exhaust opening,
wherein the fan air introduced from the intake opening flows substantially linearly along the cooling fan, the engine, and the exhaust duct and is discharged from the exhaust opening, wherein a hydraulic pump is disposed behind the engine, and the exhaust duct is disposed above the hydraulic pump.

* * * * *